March 27, 1962     K. A. MULHOLLAND     3,026,558
CASTER WHEEL ASSEMBLY
Filed April 23, 1958
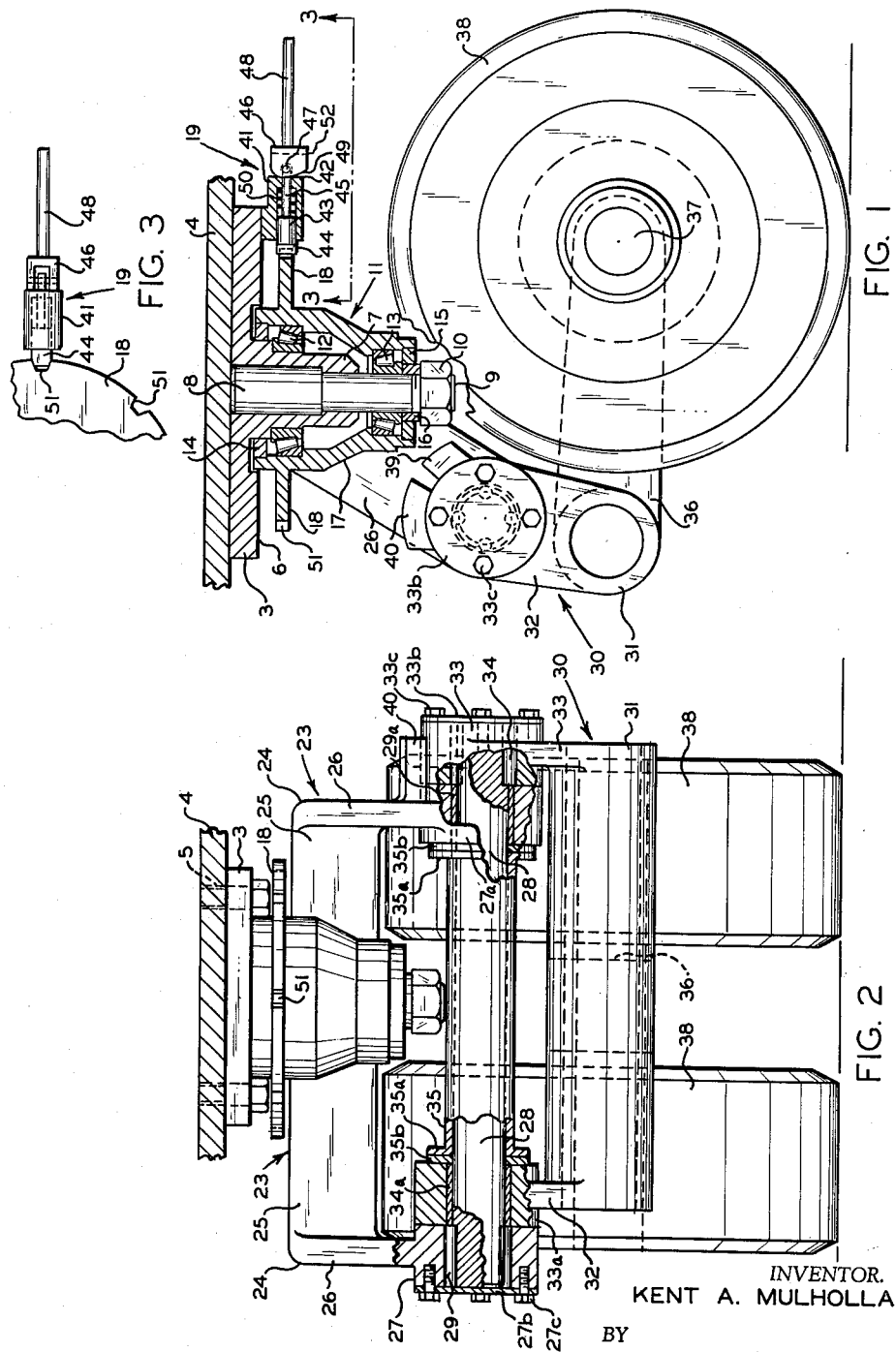
INVENTOR.
KENT A. MULHOLLAND
BY
ATTORNEYS United States Patent Office 3,026,558
Patented Mar. 27, 1962

3,026,558
CASTER WHEEL ASSEMBLY
Kent A. Mulholland, Saginaw, Mich., assignor to Saginaw Products Corporation, Saginaw, Mich., a corporation of Michigan
Filed Apr. 23, 1958, Ser. No. 730,473
4 Claims. (Cl. 16—44)

This invention relates to wheel assemblies of the kind particularly adapted for use in conjunction with material handling trucks and trailers and the like and more particularly the invention relates to a wheeled assembly which is selectively swivelable or non-swivelable about a substantially vertical axis and provided with torsion suspension apparatus for yieldably supporting a load.

Apparatus of the kind with which the invention is concerned is particularly adapted for use in conjunction with vehicles of the kind which may be pushed or drawn to transport materials from place to place in a factory, warehouse, air terminal, or other similar locations. In such locations the floor or pavement over which the vehicle is moved is relatively smooth, but even so there inevitably will be irregularities in the surface which make it desirable that, when transporting delicate mechanisms, e.g., bombs and missiles, the load supporting platform or bed of the vehicle be yieldably suspended so as to prevent the transmission of shocks to the goods being transported. In the use of equipment of this kind, it is desirable in some instances that the supporting wheels be fully and freely swivelable, whereas in other instances it is desirable that the wheels be locked against swiveling movement. Hence, in apparatus adapted selectively to be swivelable or fixed it is essential that the swivel enabling and disabling means be positive in its action.

An object of the invention is to provide a caster wheel assembly for use in conjunction with a material handling vehicle and which is provided with torsion suspension means for yieldably supporting a load carried by the vehicle.

Another object of the invention is to provide a wheel assembly having a torsion suspension equipped with means for preventing the application of a torsion force on the assembly beyond the capacity of the latter.

Another object of the invention is to provide a selectively swivelable or fixed wheel assembly having positive acting castering enabling and disabling means.

Other objects and advantages of the invention will be pointed out specifically or will become apparent from the following description when it is considered in conjunction with the appended claims and the accompanying drawing, in which:

FIGURE 1 is a side view, partly in elevation and partly in section, of a castering wheel assembly formed in accordance with the invention;

FIGURE 2 is a front elevational view of the apparatus shown in FIGURE 1; and

FIGURE 3 is a bottom plan view of a portion of the structure shown in FIGURE 1, the view showing that portion of the structure encompassed within the lines 3—3 of FIGURE 1.

Apparatus constructed in accordance with the invention comprises a mounting member or bracket 3 adapted for connection to a portion of a vehicle body 4 by means of bolts, two of which are shown at 5 in FIGURE 2. At the lower end of the member 3 is a wall 6 from which extends a substantially centrally located, downwardly projecting boss 7 having a bore therethrough shaped to receive and support a shouldered king pin 8 therein. The lower end of the king pin 8 is threaded as is shown at 9 for the accommodation of a correspondingly threaded nut 10 for a purpose presently to be explained.

A housing member generally designated 11 is adapted to be mounted on the king pin 8 and is normally freely rotatable with respect thereto as permitted by tapered roller bearings 12 and 13. The upper and lower ends of the housing 11 are sealed by bearing seals 14 and 15, respectively, the latter reacting between the wall of the member 11 and a washer 16 which surrounds the king pin 8 and against which the nut 10 seats to retain the housing 11 in assembled relation with the pin 8.

The housing 11 comprises a body portion 17 having a radially extending, annular flange 18 adjacent to its upper end adapted for cooperation with castering enabling and disabling means 19 in a manner to be pointed out hereinafter.

Externally of the housing member 11 is a pair of arm members 23, each of which is bent intermediate its ends as at 24 to form a laterally extending portion 25 rigidly fixed to the housing 11 and a right angular portion 26 extending downwardly and outwardly from the portion 25. At the end of each arm portion 26 is provided a collar 27 or 27a, each of the collars receiving at spaced points a substantially horizontally positioned torsion bar or rod 28. The torsion bar 28 is restrained from rotation within collar 27 by keys 29, whereas the torsion bar is freely rotatable relatively to the other collar 27a in a bushing 29a for a purpose presently to be explained. A cover plate 27b is secured by screws 27c.

A forked, generally bell crank shaped lever member 30 having a tubular part 31 is provided with a pair of spaced parallel arms 32, one at each end of the tubular part 31, and each of which is rigidly connected to a collar 33 or 33a similar to the collars 27, 27a. The torsion rod 28 also extends through each of the collars 33, 33a, the latter being so arranged that the collar 33a is adjacent to, but inwardly of the collar 27, and the collar 33 is adjacent to, but outwardly of the collar 27a. The torsion bar 28 is restrained from rotation within collar 33 by keys 34, whereas a bushing 34a in the collar 33a rotatably receives the rod 28. A similar cover plate 33b is secured by screws 33c. The portion of torsion bar 28 which lies between the collars 27a and 33a preferably is enclosed within a tubular member 35 having flanges 35a engaging washers 35b, the member 35 assisting in maintaining the spacing between the collars 27a, 33a and preventing the entry of foreign matter between the latter and the torsion bar.

The lever member 30 includes a substantially centrally located arm 36 which is rigidly secured at one end to the tubular part 31 and receives and supports at its other end an axle or spindle 37 on which a pair of wheels 38 may be journalled for rotation.

The arrangement of the parts described thus far is such that the wheel mounting spindle 37 is mounted for substantially vertical deflection about the axis of the torsion bar 28 and is interconnected to the freely swivelable housing member 11 through a single torsion bar.

In the use of the apparatus, a vehicle will have fixed to its load bearing body portion a suitable number of the mounting members 3, arranged in a desired manner, and on each of these frames will be mounted a swivelable housing member 11. Ground engaging wheels 38 will be mounted on the spindles 37 which each will be interconnected to its respective housing by means of the levers 30, torsion bars 28, and arms 23. When the vehicle moves over a rough place in the pavement or flooring the wheels will be deflected either upwardly or downwardly depending on whether the rough place is a depression or raised obstacle. If the wheels tend to move upwardly, the lever 30 must rock about the axes of the collars 33, 33a in a counter-clockwise direction, as viewed in FIGURE 1. Since the collar 33 is fast with the torsion bar 28, counterclockwise rocking of the lever arm will exert a counterclockwise force on the torsion bar 28, but since the other end of the bar is held fast with the collar 27, the bar 28 will twist about its longitudinal axis, thereby absorbing a substantial portion of the shocks to which the load otherwise would be subjected.

In order to prevent any possibility of twisting the torsion bar beyond its elastic limit, the collar 33 and its companion collar 27a are provided with cooperable abutment members 39, 40, respectively, which normally are angularly spaced apart, as shown in FIGURE 1, but which are engageable upon predetermined twisting of the bar 28 to limit further twisting thereof. When the obstacle causing upward deflection of the wheel carrying spindle, has been cleared, the energy stored in the twisted torsion bar 28 will return the parts to the positions shown in FIGURE 1. Downward deflection of the wheels 38 will be yieldably resisted in a manner similar to that just described, but in this instance it is not necessary to provide abutment members similar to the parts 39 and 40 inasmuch as there is no likelihood of straining the bar beyond its elastic limit.

Depending on the manner in which a vehicle equipped with castering units is to be used, either the front, or the back, or both sets of wheel assemblies should be swivelable. Since a single vehicle may be put into a large number of uses, it is preferable that such wheel assemblies be easily and positively convertible from swivelable to non-swivelable condition. Accordingly, apparatus constructed in accordance with the invention includes means designated generally by the numeral 19 for enabling and disabling castering of the wheels 38.

The enabling and disabling means 19 comprises a tubular housing 41, fixed to the mounting member 3, which is open at one end, but substantially closed at the opposite end by an apertured wall 42. Slidably mounted in the bore of the housing 41 is a plunger 43 having a tooth-like part 44 at one end and a reduced diameter shank 45 at the other end which extends through the aperture in the wall 42. The end of the shank 45 which projects through the wall 42 is pivotally connected to a clevis member 46 by means of a pin 47, the clevis member having an operating lever 48 rigidly connected thereto for effecting relative pivotal movement between the clevis and the plunger shank. As is best shown in FIGURE 1, the surfaces 49 of the clevis member's arms adjacent to the housing wall 42 are formed as cams which react against the exterior surface of the wall 42 in a manner presently to be explained. Within the housing 41 and surrounding the shank 45 is a spring 50 which reacts between the interior surface of the wall 42 and the inner end of the plunger 43 to bias the latter to projected position, i.e., towards the annular flange 18 formed on the housing member 11.

As is best illustrated in FIGURE 3, the flange 18 is provided with a plurality of peripheral notches 51, each of which is selectively adapted to accommodate the plunger's tooth-like part 44 so as to fix the housing member 11, and consequently the wheels 38, against swiveling movement when desired. Preferably there are eight notches 51 which are angularly spaced 45° apart.

In FIGURE 1, the device 19 is shown in castering disabling position, i.e., with its pawl tooth 44 projecting into one of the notches 51. To enable the wheels 38 to swivel, the operating lever 48 may be rocked about the axis of the pivot pin 47 in a clockwise direction whereupon the cam surfaces 49 will react against the wall 42 to exert a force on the plunger 43 urging it towards the right against the bias of the spring 50 so as to withdraw the tooth 44 from the notch 51. Upon 90° clockwise rotation of the operating lever 48, a flat or straight surface 52 on each arm of the clevis will be in engagement with the wall 42 and will prevent inadvertent return of the plunger and its associated parts to the positions shown in FIGURE 1. When it is desired to disable swiveling of the wheels, however, a flip of the lever 48 towards the position shown in FIGURE 1 will permit the spring to project the tooth 44 into a selected one of the notches 51.

In the preferred embodiment of the invention the plunger 43 is spring urged towards swivel disabling position, but is positively retracted to swivel enabling position. This arrangement is preferred because operation of a vehicle frequently will cause dirt, grit, and other material cast up from the wheels to cake the device 19. If the plunger were spring biased towards its swivel enabling position, rather than vice versa, it is possible that the caked material would prevent retraction of the tooth from a notch. This is avoided in the preferred construction, since the plunger and its associated parts are positively acted on by the operating lever and its parts to effect retraction of the tooth from a notch.

When it is desired to operate the enabling and disabling device 19 to change the wheel assembly from swivelable to non-swivable condition, the vehicle usually will be at a standstill. In order to be certain that the wheel will be fixed in a desired position, it may be necessary to swivel the wheels while the vehicle is stationary so as to align the locking plunger 43 with the selected notch 51 in the flange 18. Since it is difficult to swivel a vehicle supporting wheel when the vehicle is stationary, the apparatus constructed in accordance with the invention includes the tubular part 31 in the lever means 30, the function of the part 31 being to receive an end of a rod or bar (not shown) to facilitate rotation of the wheels about the axis of the king pin 8 when the vehicle is at rest. In a caster wheel assembly which does not swivel there would be no need for the tubular section 31, of course.

The disclosed embodiment is representative of a presently preferred form of the invention, but is intended to be illustrative rather than definitive thereof. The invention is defined in the claims.

I claim:

1. A caster assembly comprising; a caster housing member adapted to depend from a frame to be supported; yoke means including a web portion mounted by said housing member and a pair of extending, spaced apart arms rigidly connected with said web portion; torsion bar means substantially spanning and carried by said arms; one arm having its free end rigidly connected to said torsion bar means near one end of the torsion bar means; the second arm having its free end journaling the opposite end of the torsion bar means; a wheel journaling axle parallel with and substantially coextensive with said torsion bar means; and lever means rigidly connected to said axle and including an arm mounted fast to said torsion bar means near its said opposite end and an arm journaled on the said torsion bar means near the said one end, so that said wheel can pivot about said torsion bar means as a fulcrum while the pivotal movement is torsionally resisted thereby.

2. A caster assembly comprising; a caster housing member adapted to depend from a frame to be supported; yoke means including a central portion rigidly connected to said housing member and a pair of extending, spaced apart arms rigidly connected with said central portion; elongate torsion bar means substantially spanning and carrying said arms; one arm having its free end rigidly connected to said torsion bar means near one end of the torsion bar means; the second arm having its free end journaling the torsion bar means near the opposite end of said torsion bar means; wheel supporting axle means generally parallel with and generally coextensive with said torsion bar means; and lever means rigidly connected to said axle means and pivotal about said torsion bar means including an arm mounted fast to said torsion bar means near its said opposite end so that pivoting of said lever means is torsionally resisted by said torsion bar means and an arm journaled on and supporting the said torsion bar means near the said one end.

3. A caster assembly comprising; a caster housing member adapted to depend from a frame to be supported;

arm means rigidly connected with said housing member; an elongate, resilient metal torsion bar carrying said arm means; said arm means having a portion rigidly connected to said torsion bar near one end of the torsion bar; wheel supporting axle means generally parallel with and generally coextensive with said torsion bar; and lever means, pivotal about said torsion bar while resisted in said pivotal movement thereby, rigidly connected to said axle and including a first portion mounted fast to said torsion bar near the opposite end of said torsion bar and a second portion journaling said torsion bar.

4. A caster assembly comprising; a caster housing member adapted to depend from a frame to be supported, including arm means rigidly extending from said housing; an elongate, resilient metal torsion bar carrying said arm means; one portion of said arm means having its free end rigidly connected to said torsion bar and a second portion journaling the torsion bar; wheel supporting axle means generally parallel with and generally coextensive with said torsion bar; and lever means, pivotal about said torsion bar while resisted in said pivotal movement thereby, rigidly connected to said axle means and including a portion mounted fast to said torsion bar near its said opposite end.

References Cited in the file of this patent

UNITED STATES PATENTS

| | | |
|---|---|---|
| 595,290 | Dowman | Dec. 14, 1897 |
| 2,410,570 | Davis | Nov. 5, 1946 |
| 2,422,892 | Forbes | June 24, 1947 |
| 2,438,432 | Edwards | Mar. 23, 1948 |
| 2,582,716 | Nelson | Jan. 15, 1952 |
| 2,700,173 | Huffman | Jan. 25, 1955 |
| 2,751,217 | Thompson | June 19, 1956 |
| 2,753,946 | Quayle | July 10, 1956 |
| 2,820,644 | Smith | Jan. 21, 1958 |

FOREIGN PATENTS

| | | |
|---|---|---|
| 151,918 | Switzerland | Apr. 1, 1932 |